United States Patent [19]

Urbanek

[11] Patent Number: 5,789,034
[45] Date of Patent: Aug. 4, 1998

[54] APPARATUS FOR THE INJECTION MOLDING OF PLASTIC MATERIAL

[75] Inventor: Otto Urbanek, Linz, Austria

[73] Assignee: Engel Maschinenbau Gesellschaft m.b.H., Schwertberg, Austria

[21] Appl. No.: 815,597

[22] Filed: Mar. 12, 1997

[30] Foreign Application Priority Data

Mar. 14, 1996 [AT] Austria ........................ 140/96

[51] Int. Cl.⁶ .......................................... B29C 45/67
[52] U.S. Cl. ............................ 425/589; 425/450.1
[58] Field of Search ...................... 249/114; 425/589, 425/590, 595, 450.1, 451.9

[56] References Cited

U.S. PATENT DOCUMENTS

| | | | |
|---|---|---|---|
| 4,744,740 | 5/1988 | Kojima | 425/595 |
| 4,925,618 | 5/1990 | Takada | 425/595 |
| 5,147,661 | 9/1992 | Kurumaji et al. | 425/451.7 |
| 5,211,970 | 5/1993 | Sakurai et al. | 425/595 |
| 5,249,951 | 10/1993 | Leonhartsberger et al. | 425/451.9 |
| 5,302,108 | 4/1994 | Wohlrab | 425/595 |
| 5,332,385 | 7/1994 | Leonhartsberger | 425/595 |
| 5,536,166 | 7/1996 | Schad | 425/451.9 |
| 5,556,656 | 9/1996 | Lampl et al. | 425/451.9 |

OTHER PUBLICATIONS

Metals Handbook, Tenth Edition, vol. 1, ASM International, pp. 33–50, Mar. 1990.

ASM Handbook, vol. 5, ASM International, p. 735, Dec. 1994.

*Primary Examiner*—James P. Mackey
*Attorney, Agent, or Firm*—Notaro & Michalos P.C.

[57] ABSTRACT

Apparatus for the injection molding of plastic material into a mold formed from two mold halves (8, 9), wherein one mold half (9) is arranged on a movable mold mounting plate (7) and the piston rod (1) applying the closing pressure to that mold mounting plate (7) takes part in the movement of the mold mounting plate (7) and in so doing slides with its outside against the inner seal (17) of a stationary cylinder tube (3), wherein the cast piston rod (1) is provided in the region which comes into contact with the seal (2) of the cylinder tube (3) with a hard coating of another material.

10 Claims, 1 Drawing Sheet

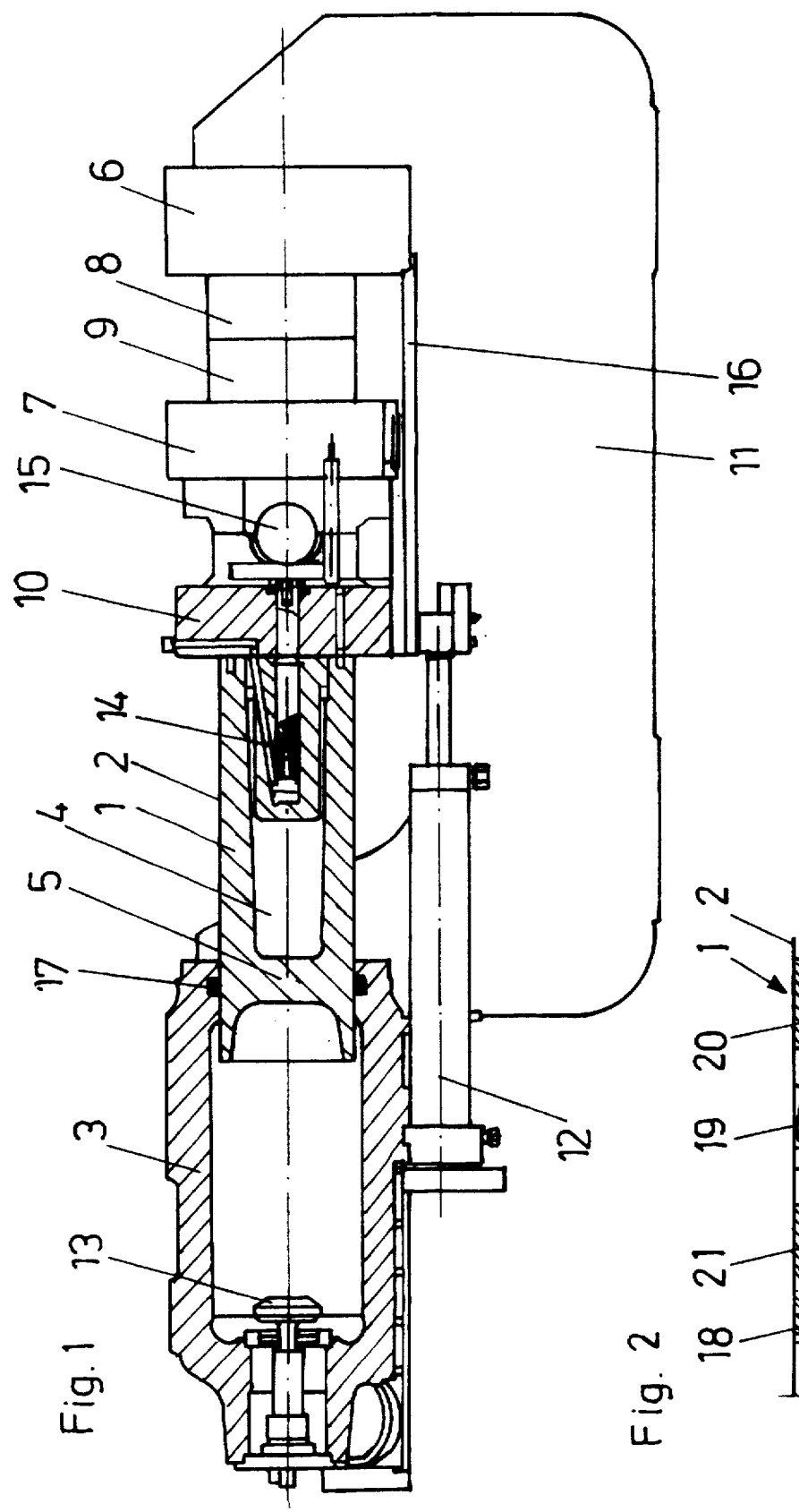

APPARATUS FOR THE INJECTION MOLDING OF PLASTIC MATERIAL

FIELD AND BACKGROUND OF THE INVENTION

The invention concerns an apparatus for the injection molding of plastic material into a mold formed from two mold halves, wherein one mold half is arranged on a movable mold mounting plate and the piston rod applying the closing pressure to that mold mounting plate takes part in the movement of the mold mounting plate and in so doing slides with its outside against the inner seal of a stationary cylinder tube.

An apparatus of that kind is very simple from the point of view of structure but it suffers from the disadvantage that, with an increasing size of machine, the piston rod which is usually in the form of a plunger piston also attains a considerable size. With a closing pressure for example of 1.5 MN the diameter of the piston rod is about 300 mm and its length is about 1000 mm.

The starting material used nowadays for the piston rods is without exception forged solid cylinders which are put into their definitive form by cutting machining. In that respect the procedure involved is limited to producing in the piston rod those bores which are necessary for the apparatus to function, in particular therefore a cavity for the ejection device which serves to eject the moldings. Because of the high costs concerned, the possibility of machining away material that is not required for strength reasons is not adopted, and thus unnecessarily large masses are moved in operation of the injection molding machine.

Particular requirements are made in regard to the quality of material, because of friction at the seal. With larger diameters however the risk of non-metallic inclusions, slag formation, rolling flaws and forging flaws increases. This means that, at a very late time in the production procedure, namely when the surface is being put into the final condition, flaws may occur, which are of significance in regard to the suitability for use, so that the work which has already been done is wasted.

In spite of the above-indicated disadvantages of using forged solid cylinders as the starting material, manufacturers have hitherto refrained from producing the piston rods of the closing cylinder of injection molding machines in a casting process and thus in the definitive form, apart from surface machining. The reason for that was that cast steel or iron cannot be hardened by surface heat treatment such as inductive hardening or flame hardening or by nitriding to such an extent as is required by the described kind of use. Such a piston rod would not attain the necessary hardness by virtue of nitriding. Such hardness would admittedly be achieved by flame hardening, but in that case the surface roughness cannot be reduced sufficiently.

SUMMARY OF THE INVENTION

In comparison the object of the invention is to develop a piston rod with better functional properties. In that respect the basic consideration involved is that the primary function of the piston rod is that of making a hydraulic cylinder fluid-tight relative to the exterior and transmitting the axial force applied. The mass to be moved is to be as small as possible. The running surface of the piston is to have a surface which ensures sealing integrity of the system, even after a prolonged wear loading.

The invention permits the object to be attained in that the piston rod which is cast from an iron-base alloy in definitive form—apart from surface machining—is provided in the region which comes into contact with the seal of the cylinder tube with a hard coating of another material.

Producing the piston rod by a casting process makes it possible for the form of the piston rod to be such that no superfluous material has to be moved in operation of the apparatus. The material which is not required to carry the forces acting from the exterior is omitted from the outset. As a piston rod in the form of a plunger piston for the closing means of an injection molding machine is substantially loaded in compression and castable iron alloys are distinguished by good compression strength, this means that a substantial part of the volume of the piston rod can be hollowed out. In its optimum form the piston rod is represented as a tube of spheroidal graphite iron, which is subdivided by a transverse wall.

The problem when using cast piston rods is that the running surface of the piston rod, which comes into contact with the seal of the cylinder tube, periodically passes into the open in operation of the apparatus and is there exposed to a certain risk of fouling. That in turn requires the seals to be of a relatively robust structure and ultimately sets high levels of requirement in terms of hardness and avoiding roughness in regard to the running surface of the piston rod. It was certainly surprising that those requirements can be satisfied when using a casting, especially as simply improving the structure in the region near the surface was ruled out admittedly as a possible solution but which ultimately was still not entirely satisfactory. The object was first attained by the application of a coating in the form of a hard-metal or ceramic functional layer applied in a thermal spray process, as will be described in detail in the course of the specific description hereinafter.

BRIEF DESCRIPTION OF THE DRAWINGS

In the drawing FIG. 1 is a view in longitudinal section through the closing side of an injection molding apparatus provided with the piston rod according to the invention. FIG. 2 is a portion on an enlarged scale through the region of contact between the coating on the piston rod and the seal of the cylinder tube.

BRIEF DESCRIPTION OF THE PREFERRED EMBODIMENTS

The closing side of an injection molding apparatus, as is shown in FIG. 1, essentially comprises a frame 11 to which a mold mounting plate 6 is fixedly connected, whereas a further mold mounting plate 7 is displaceable on rails 16 in order to be able to open and close or press together the mold which consists of the mold halves 8, 9. Opening and closing of the mold is effected by means of hydraulic cylinders 12 which are arranged in pairs. The closing pressure applied to the closed mold on the other hand is exerted by a hydraulic cylinder, the essential parts of which are the cylinder tube 3 and the piston rod 1.

When the mold is closed, that is to say moved into the position shown in FIG. 1, a large amount of hydraulic fluid is sucked along into the interior of the cylinder tube 3 by way of the valve 13. The closing pressure is then built up in the interior of the cylinder tube 3, that closing pressure being transmitted by way of the piston rod 1 and the ejector plate 10 to the movable mold mounting plate 7 and therewith to the mold. As the illustrated apparatus is a machine without frame beam members, a pivot 15 is disposed between the ejector plate 10 and the mold mounting plate 7.

The essential aspect for the invention is that the piston rod 1 comprises a cast iron alloy, for example of spheroidal graphite iron GGG 70 or GGG 50 and is coated with an anti-wear layer in order permanently to withstand the friction which occurs at the seal 17. That construction makes it possible for the piston rod 1 to be provided with a cavity 4 which can be of larger dimensions than would be necessary to accommodate the ejector device 14. Cavity 4 is subdivided by a transverse wall 5.

FIG. 2 shows the region of contact between the cylinder tube 3 and the piston rod 1. It will be seen here that the seal which is generally identified by 17 in FIG. 1 comprises a primary seal 18 which must withstand the high closing pressure and a secondary seal 19 which is to prevent leakage losses. A dirt scraper 20 is disposed in front of those two sealing elements. In order reliably to prevent metal contact between the piston rod 1 and the cylinder tube 3, there are also provided guide strips 21 which are interrupted in the peripheral direction and which heavily load the wear resistance of the surface of the piston rod 1. For that reason the piston rod 1 is provided with the coating 2 according to the invention which for example can comprise hard metal. In this case application by so-called high-speed flame spraying is recommended. In that procedure small particles of metal carbide, in particular tungsten carbide, are flung on to the surface of the piston rod at several times the speed of sound and are mechanically joined to the surface of the piston rod. In contrast the application of ceramic metal oxides, for example CrO or aluminum oxide/zirconium oxide, is effected better at high temperatures in a plasma coating process. In both cases the basic body is not involved in fusing in the coating operation, the surface properties are determined completely by the coating material. The thickness of the corresponding layer is preferably between 0.1 and 0.4 mm, which permits regrinding of the surface produced.

In order to produce a particularly smooth surface it is advantageous, prior to application of the coating, to roughen the casting and to carefully clean it, in particular by means of ultrasound.

I claim:

1. An injection molding machine for an injection molding of plastic material into a closed mold formed by two mold halves, said injection molding machine comprising:

a frame;

a fixed mold mounting plate fixedly connected to said frame, one of the mold halves being arranged on said fixed mold mounting plate;

a movable mold mounting plate, the other of the mold halves being arranged on said movable mold mounting plate;

a piston-cylinder assembly for applying a closing pressure to said closed mold, said piston-cylinder assembly comprising a stationary cylinder tube and a cast plunger p ton, said stationary cylinder tube having an inner surface, a seal arranged on said inner surface for sealing said plunger piston against said cylinder tube, said cast plunger piston consisting of an iron-base alloy and having an outer surface contacting said seal, said outer surface having a coating of another material which is harder than said iron-based alloy for hardening said outer surface and for sliding against said seal.

2. An injection molding machine as set forth in claim 1 wherein said coating comprises a hard metal.

3. An injection molding machine as set forth in claim 1 wherein said coating predominantly comprises tungsten carbide.

4. An injection molding machine as set forth in claim 1 wherein said coating comprises a ceramic material.

5. An injection molding machine as set forth in claim 4 wherein said coating comprises chromium oxide or aluminum oxide/zirconium oxide.

6. An injection molding machine as set forth in claim 1 wherein said coating has a thickness of 0.1 to 0.4 mm.

7. An injection molding machine as set forth in claim 1 wherein said plunger piston comprises cast spheroidal graphite iron.

8. An injection molding machine as set forth in claim 1 wherein said piston is in the form of a tube subdivided by a transverse wall.

9. An injection molding machine as set forth in claim 1, wherein said seal comprises a primary seal, a secondary seal axially spaced from but adjacent to said primary seal and a dirt scraper adjacent said secondary seal, said primary and secondary seals sliding against the coating of said plunger piston.

10. An injection molding machine according to claim 9 including a guide strip between said primary and secondary seals.

* * * * *